United States Patent [19]
DePasquale

[11] Patent Number: 5,617,470
[45] Date of Patent: Apr. 1, 1997

[54] APPARATUS AND METHOD FOR PREVENTING UNAUTHORIZED ACCESS TO A SYSTEM

[76] Inventor: George B. DePasquale, 1820 Albany Ave., West Hartford, Conn. 06117

[21] Appl. No.: 459,038

[22] Filed: Jun. 2, 1995

[51] Int. Cl.⁶ .......................... H04M 15/00; H04M 17/00
[52] U.S. Cl. .......................... 379/114; 379/112; 379/113; 379/144; 379/145
[58] Field of Search .............................. 379/95, 111–115, 379/144, 145, 188–189, 196–200, 357; 340/825.3, 825.31, 825.34, 825.51; 380/23, 24, 25

[56] References Cited

U.S. PATENT DOCUMENTS

| | | | |
|---|---|---|---|
| 5,287,403 | 2/1994 | Atkins | 379/144 |
| 5,357,564 | 10/1994 | Gupta | 379/188 |
| 5,479,494 | 12/1995 | Clitherow | 379/144 |
| 5,502,759 | 3/1996 | Cheng | 379/189 |
| 5,506,893 | 4/1996 | Buscher | 379/112 |

Primary Examiner—Wellington Chin
Assistant Examiner—Vijay Shankar
Attorney, Agent, or Firm—McCormick, Paulding & Huber

[57] ABSTRACT

Apparatus and methods for preventing access to a telephone service by unauthorized users employ an access code preferably having a fixed component which identifies an authorized user, and having a plurality of variable components associated with the fixed component so that at least one of the plurality of variable components is currently valid for the purpose of processing a telephone call by the service. The variable component is changed from among the plurality of variable components with each telephone call in a predetermined sequence to prevent stealing of the access code by unauthorized users. A credit card may be employed listing the plurality of variable access codes in a predetermined sequence to allow the authorized user to determine which variable component will be currently recognized by the telephone service based on the number of telephone call made with the credit card. A cellular phone may be used with the telephone service to automatically generate the currently valid variable component of the access code when a new telephone call is made.

18 Claims, 5 Drawing Sheets

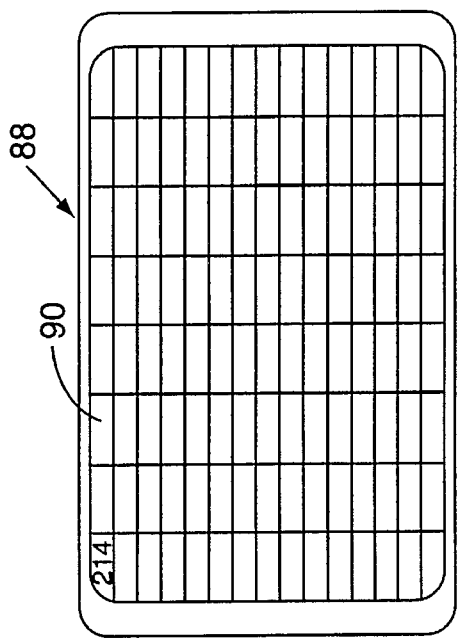
FIG. 10
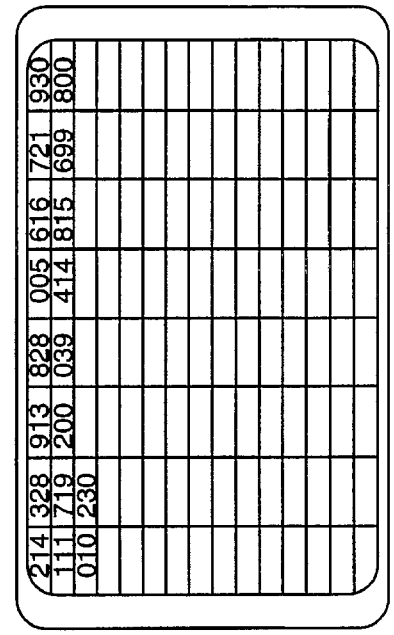
FIG. 12
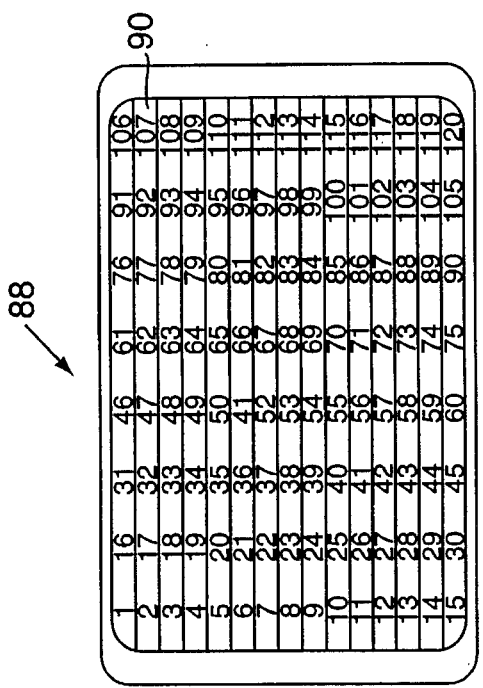
FIG. 9
FIG. 11

APPARATUS AND METHOD FOR PREVENTING UNAUTHORIZED ACCESS TO A SYSTEM

FIELD OF THE INVENTION

The present invention relates to apparatuses and methods for preventing unauthorized access to a system, and more particularly, to apparatuses and methods for preventing unauthorized access to a telephone service.

BACKGROUND INFORMATION

Unauthorized entry into systems that provide privileged information or services is a security problem that has grown considerably since the dawn of the computer age. For instance, the telephone service industry loses approximately two billion dollars a year because of unauthorized entry into its subscriber services. The cellular phone industry has typically responded to telephone fraud by providing each authorized user with an access code to be transmitted to the phone service to gain entry. However, an intercepting apparatus costing as little as $250 has recently emerged in California which electromagnetically intercepts and identifies transmitted access codes. Once an access code is intercepted, an unauthorized user can typically charge telephone calls to the authorized user's account until the fraud is detected when the authorized user receives his telephone account bill—typically at the end of each month. Once notified of the fraud, the telephone service will swiftly change the access code and most likely bear the cost of the fraudulent calls.

Telephone fraud problems also arise with telephone credit cards which provide an access code for charging a telephone service subscriber's long distance telephone calls. A typical scam involves a spy using binoculars or like device to visually intercept an access code that is being entered into a pay telephone by an authorized user. Once the access code is intercepted, the stolen code can be repeatedly used by the interceptor until the authorized user learns of the fraud when receiving his periodic telephone service bill.

Telephone services have attempted to make it more difficult to steal a telephone service access code. For example, U.S. Pat. No. 4,761,808 issued to Howard shows a time code telephone security access system. The system uses an access code comprising an address code that is fixed and a time-based code portion that changes over time in a predetermined manner. However synchronization problems can easily arise between the transmitting end and the receiving end of a telephone call using such a system. For example, some cellular phones include an internal clock for determining the time-based access code. If the clock in the cellular phone is not perfectly synchronized with the clock at the telephone service, a telephone call by an authorized user may be rejected. Similar problems arise when using a telephone credit card if the timepiece of the authorized user is not synchronized with the clock of the telephone service.

It is the object of the present invention to overcome the drawbacks and disadvantages of prior art apparatuses and methods for preventing access to a telephone service.

SUMMARY OF THE INVENTION

The present direction is directed to an apparatus and methods for preventing access to a telephone service by unauthorized users. Preferably, an access code has a fixed component which identifies an authorized user, and has a plurality of variable components associated with the fixed component such that at least one of the plurality of variable components is currently valid for the purpose of processing a telephone call by the service. The at least one valid variable component is changed from among the plurality of variable components with each telephone call in a predetermined sequence usable by the authorized user and the telephone service to prevent stealing of the access code by unauthorized users. The access code may also be comprised solely by a plurality of variable codes which both identifies the authorized user and identifies the currently valid code for making the current telephone call.

A credit card listing the plurality of variable access codes in a predetermined sequence allows the authorized user to determine which variable component will be currently recognized by the telephone service based on the number of telephone call made with the credit card. The access code may also be comprised solely by a plurality of variable codes listed on the credit card which both identifies the authorized user and identifies the currently valid code for making the current telephone call.

A cellular phone that is used with the telephone service automatically displays the currently valid variable component of the access code when a new telephone call is made so that an authorized user need not keep track of the number of telephone calls made in order to determine the currently valid component of the user's access code.

BRIEF DESCRIPTION OF THE DRAWINGS

FIG. 5 is a top plan view of a telephone credit card when making a first phone call with the card.

FIG. 6 is a bottom plan view of the telephone credit card of FIG. 5.

FIG. 7 is a top plan view of the credit card of FIG. 5 when making the second phone call with the card.

FIG. 8 is a top plan view of the credit card of FIG. 5 when making the fifty-first phone call with the card.

FIG. 9 is a top plan view of another embodiment of a credit card when making the first phone call with the card.

FIG. 10 is a bottom plan view of the credit card of FIG. 9.

FIG. 11 is a top plan view of the credit card of FIG. 9 when making the second phone call with the card.

FIG. 12 is a top plan view of the credit card of FIG. 9 when making the eighteenth phone call with the card.

DETAILED DESCRIPTION OF THE PREFERRED EMBODIMENTS

Figure 1:
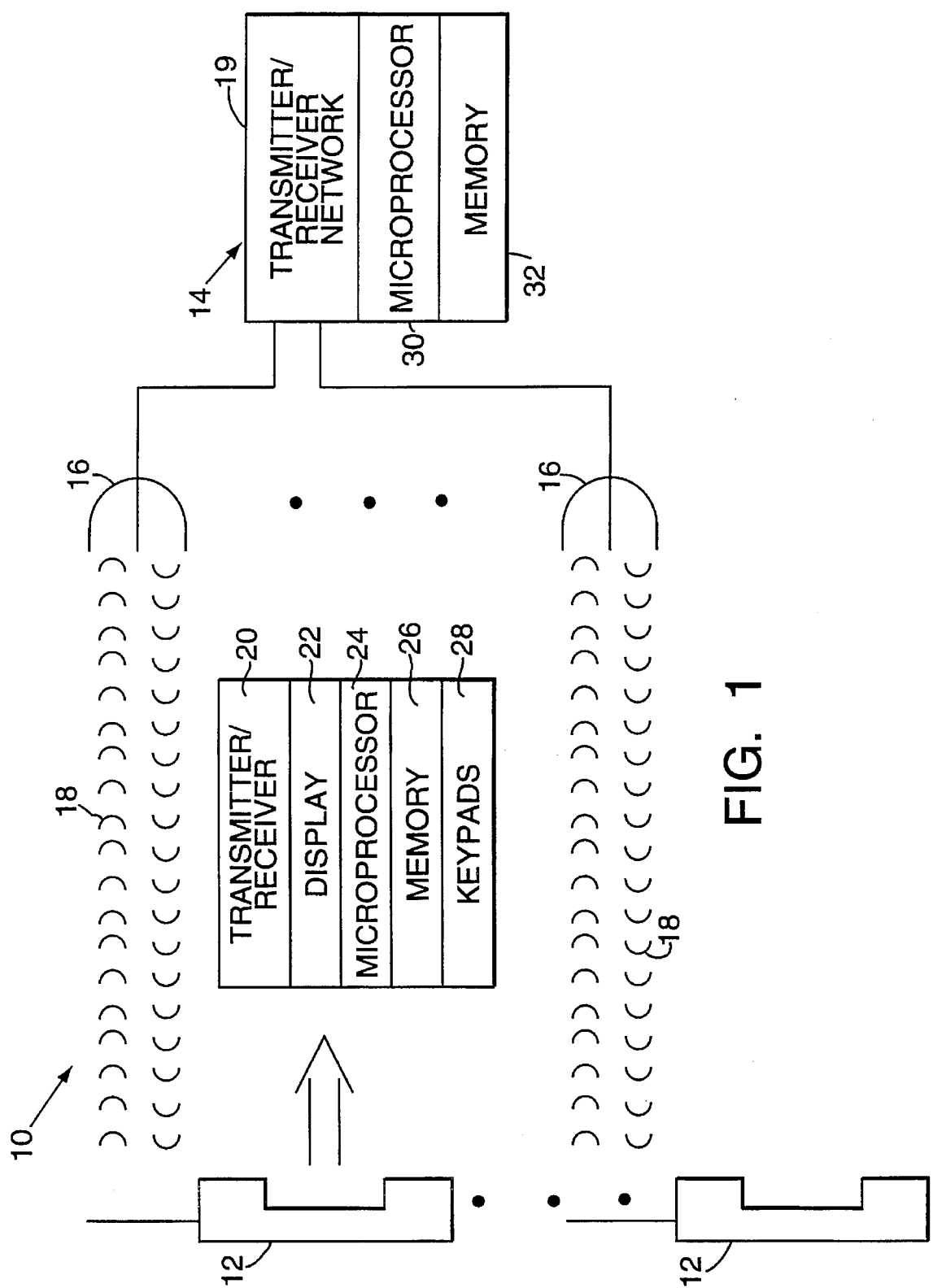
FIG. 1 schematically illustrates a cellular phone system employing the present invention.

In FIG. 1, a system embodying the present invention for preventing unauthorized access to a telephone service is indicated generally by the reference numeral 10. For illustrative purposes, the embodiment is employed with a cellular telephone service. The system comprises one or more cellular telephones 12, 12 that are used by authorized or paying subscribers to transmit telephone calls through a cellular telephone service 14. One or more telephone service transmitter-receivers 16, 16 (service transmitters) transmits and receives electromagnetic signals 18, 18 conveying telephone messages associated with the cellular telephones. The service transmitters form a part of a transmitter-receiver network 19 (transmitter network) of the cellular telephone service 14 for processing received and transmitted information.

As shown schematically in FIG. 1, each of the cellular telephones 12, 12 includes its own transmitter-receiver 20 (telephone transmitter) for serially transmitting electromagnetic signals conveying a telephone access code and telephone number which is typically shown on display 22, as well as transmitting to and receiving from the service transmitters electromagnetic signals conveying a telephone conversation. Each cellular telephone further includes a microprocessor 24 and memory 26 which cooperate to transmit a telephone call. The access code and telephone number are entered into the cellular telephone via keypads 28 or any similar entering means. The microprocessor and memory may be either physically separate from one another or contained in a single, discrete component.

The transmitter network 19 of the telephone service 14 can simultaneously receive a plurality of telephone messages directed to and from the service transmitters 16, 16. Microprocessor network 30 and memory 32 cooperate to process the received and transmitted telephone messages at the telephone system and may comprise separate or discrete components.

Figure 2:
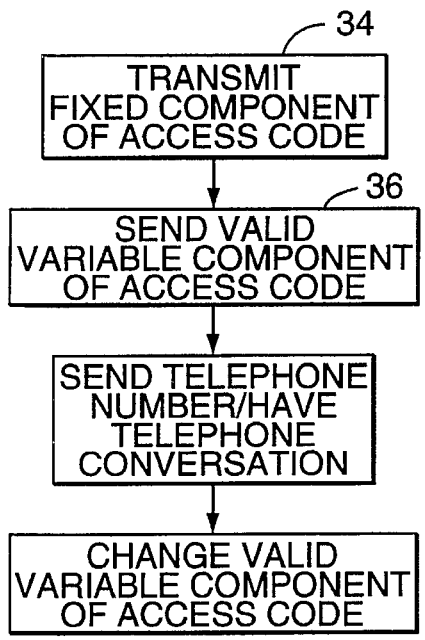
FIG. 2 is a flow chart illustrating the steps for transmitting a telephone call from a cellular telephone in accordance with the present invention.

FIG. 2 is a flow chart illustrating the steps for transmitting a telephone call from a cellular phone using the system of FIG. 1 in order to prevent unauthorized access to a cellular telephone service. A telephone call from one of the cellular telephones 12, 12 (shown in FIG. 1) is initiated by transmitting a fixed component of an access code which is assigned to an authorized user (step 34). The fixed component of an access code is typically a plurality of numbers which is unique to each authorized or paying customer of the cellular service. For example, the five digit number "12345" is an example of such a fixed component of the access code. The fixed component may have a particular meaning associated with the authorized user—for example the user's home telephone number, or the fixed component might be selected at random by the telephone service. In addition, the fixed component may be memorized by the authorized user and manually input by keypad into the cellular telephone, or may be initially stored in the cellular telephone memory and automatically recalled and subsequently transmitted by pressing one or more conventional retrieval buttons on the cellular phone keypad.

In order to protect the authorized user from others intercepting the access code, the present invention next sends a valid variable component of the access code which automatically changes with each telephone call in a predetermined sequence usable by the authorized user and the telephone service (step 36). Each authorized user is assigned a plurality of variable access codes which are initially stored in the memory 26 (shown in FIG. 1) of the user's cellular telephone. As an example, each authorized user may be assigned 120 variable components associated with his fixed access code, and each of the variable components may comprise a different number. For example, the variable component may comprise a three digit number; however, any number of digits may be selected to comprise the variable component. Typically, only one of the plurality of variable access codes is valid for a given telephone call so as to be recognized by the cellular telephone service. The cellular phone may transmit the currently valid variable component either automatically or upon entering a sequence of recall buttons on the keypad to retrieve the valid code from memory. Next, the telephone number is entered on the cellular phone keypad and transmitted to the telephone service which then processes the telephone conversation (step 38). Sometime during or after the telephone call, the microprocessor 24 of the cellular telephone 12 (shown in FIG. 1) automatically changes the valid variable component of the access code from among the plurality of variable components stored in the memory 26, according to a predetermined sequence shared by the telephone service (step 40).

Figure 3:
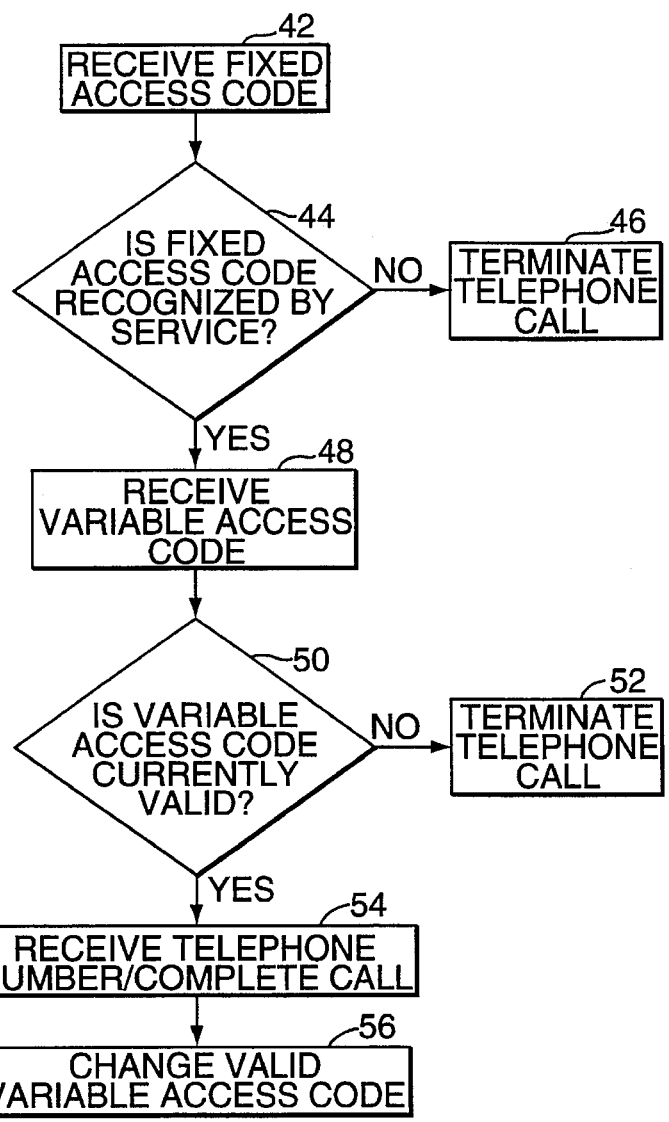
FIG. 3 is a flow chart illustrating the steps for receiving a telephone call by a telephone service in accordance with the present invention.

Turning now to FIG. 3, a flow chart illustrates the corresponding steps of the telephone service 14 of FIG. 1 for receiving, transmitting and processing a telephone call in order to prevent unauthorized access to the service. The service transmitter 19 of FIG. 1 first receives an electromagnetic signal conveying a fixed component of an access code (fixed code) that identifies an authorized user (step 42). The microprocessor network 30 then compares the received fixed code with the fixed codes associated with the authorized users stored in the network memory 32 to determine if there is a match (step 44). If the received code is not recognized as that of an authorized user, the telephone service will terminate the telephone call (step 46). If the service does recognize the fixed code, the service will then receive a variable component of the access code (variable code) (step 48). The system will then retrieve from the network memory 32 the currently valid code from among a plurality of variable codes associated with the authorized user and determine if there is a match with the received variable code (step 50). If there is no match the service will terminate the telephone call (step 52). If there is a match, the service will receive a telephone number and complete the call (step 54). Sometime during or after the telephone call, the system will automatically change the valid variable code from among the plurality of variable codes associated with the authorized user in the memory 32 shown in FIG. 1 according to a predetermined sequence shared also by the authorized user (step 56).

As can be seen from the flow charts in FIGS. 2 and 3, the present invention eliminates any synchronization problems between a telephone customer and the telephone service in keeping track of the currently valid access code, thereby increasing the chances that the authorized user's telephone call will be processed. The present invention may also be modified to eliminate the fixed component of the access code. In other words, each authorized user is assigned a plurality of variable codes associated exclusively with the authorized user. The variable codes both identify the authorized user and identify the currently valid code for making the present telephone call. The procedural steps for this modification are similar to those shown in FIGS. 2 and 3 except step 34 in FIG. 2 (transmit fixed component of access code) and steps 42–46 in FIG. 3 (receive and compare fixed access code for a match) are eliminated. However, such a modification would be unwieldy since each of the variable codes would require a relatively large number of digits to carry information for both customer identification and the current telephone code.

Figure 4:
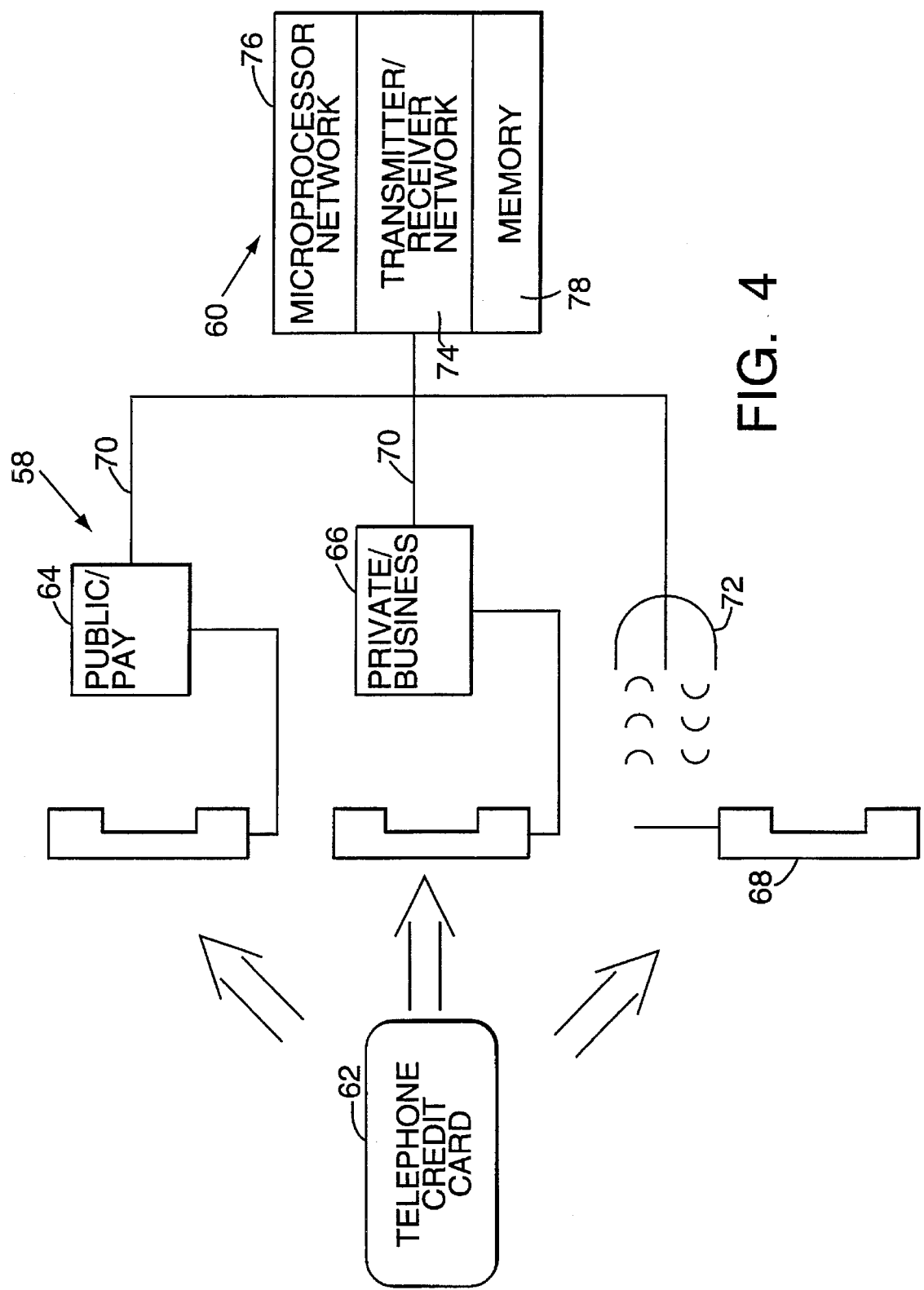
FIG. 4 schematically illustrates another embodiment of a telephone system employing a telephone credit card.

FIG. 4 schematically illustrates another embodiment of an expanded system for preventing unauthorized access to a telephone service indicated generally by the reference numeral 58. For illustrative purposes, the embodiment is employed with a telephone credit card service. Similar to the first embodiment of FIGS. 1 through 3, fixed and variable components of an access code (fixed and variable codes) are employed to gain access to a telephone service. With respect to FIG. 4, each authorized user to a telephone service 60 is provided a telephone credit card, such as card 62 that lists a plurality of variable codes associated with each authorized credit card user. The authorized user can make telephone calls with the credit card using any number and types of telephones. For example, an authorized user can use a public/pay telephone 64, a private/business telephone 66 or a cellular telephone 68. The telephone messages are sent over telephone wires 70, 70 or, when using a cellular telephone, transmitted to one of a plurality of telephone service transmitter-receivers (service transmitters), such as service transmitter 72. The telephone wires and service transmitters comprise part of a transmitter-receiver network 74 of the telephone service 60 that receives both wire and electromagnetic transmissions. The telephone service 60 further includes a microprocessor network 76 for processing the telephone messages and memory 78 for storing information and interacting with the microprocessor as explained in the first embodiment.

Figures 5, 6, 7, 8:
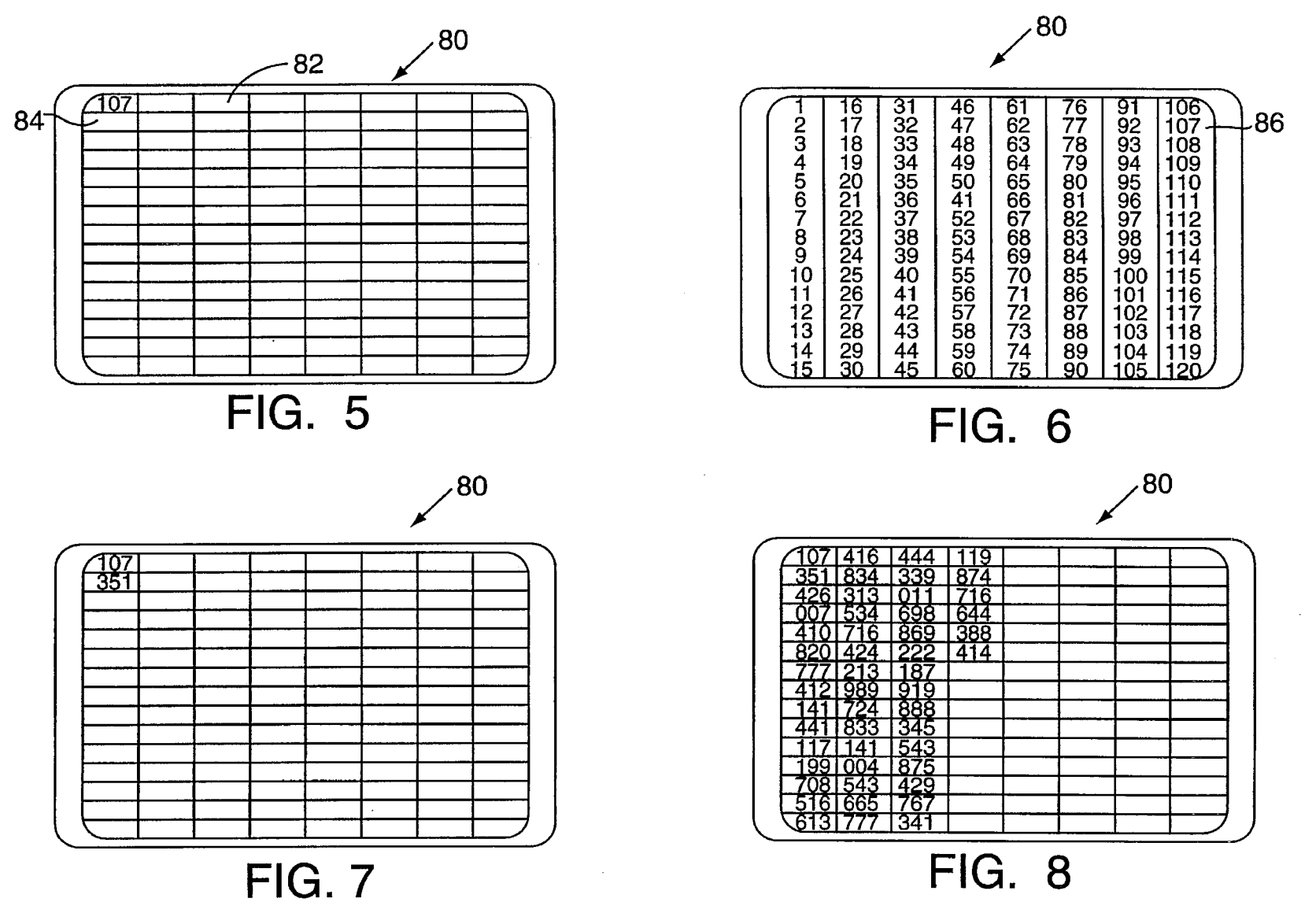

Turning now to FIGS. 5–8, a credit card for listing the variable components of an access code (variable codes) will be explained in detail. FIG. 5 shows a front face 82 of a credit card 80 used in accordance with the present invention wherein the variable codes associated with an authorized user of the credit card are initially hidden behind an opaque material 84 which can be either peeled or rubbed off to expose the next valid variable code after each telephone call is made—preferably just prior to making the next telephone call. In this example, the credit card 80 includes 120 variable codes each comprising three digits and distributed in eight columns and fifteen rows, where an individual variable code is defined in a unique row and column. Of course, a different number of rows, columns and digits comprising a variable code may be selected. As can be seen in FIG. 5, the first component to be exposed by removing the opaque material is "107". Hence, the authorized user's first phone call using this card will comprise entering the fixed component of the user's access code (fixed code), for example "12345" (identifying the user), and then entering the currently valid variable code (in this instance "107") associated with the authorized user of the credit card 80. The telephone service will simultaneously receive the fixed code and determine if the component matches a fixed code stored in the service's memory. If there is such a match, the telephone service identifies the authorized user associated with the fixed code and then retrieves the currently valid variable code associated with the identified user. If the received variable code matches the currently valid variable code stored in the telephone service's memory, then the telephone call will be processed and the valid variable code will be changed according to a predetermined pattern usable only by the authorized user and the telephone service. However, if the received variable code does not match, the service recognizes that it is highly likely that an unauthorized user is trying to make an illegal telephone call, and therefore the service will terminate the telephone call. The procedure of transmitting and receiving the fixed and variable codes is similar to the procedure shown with respect to cellular telephones in FIGS. 1–3 except that the display on the cellular phone in the preceding embodiment automatically informs the authorized user of the currently valid variable code, as opposed to the listing on the credit card in this embodiment.

FIG. 6 shows a back face 86 of the credit card 80 which may be used for showing the order of exposing the currently valid variable code for making the next telephone call. As can be seen in FIG. 6 the numbers "1" through "15" are listed in increasing order from the first column, first row to the first column, fifteenth row. The numbers "16" through "30" are listed in increasing order from the second column, first row to the second column, fifteenth row. This pattern continues column by column ending with the numbers "106" through "120" listed in increasing order from the eighth column, first row to the eighth column, fifteenth row.

Therefore, to find the next valid variable code to be exposed for making the second telephone call, the authorized user merely looks at the back face of the credit card as shown in FIG. 6 and notes that the number "2" associated with the second telephone call is located in the second row, first column. The user then turns the card over to the front face 84 and removes the opaque material over the second row, first column so as to expose the number "351" as shown in FIG. 7. The number "351" is the currently valid variable code that will be recognized by the telephone service.

After the entire first column of numbers is exposed upon making fifteen telephone calls, the second column of components is exposed in the same manner as that of the first column. Each column is exposed in increasing number (from left to right as shown in FIGS. 5, 7 and 8 until the eighth column is fully exposed. For example, FIG. 8 shows the currently valid variable component "414" located in the fourth column, sixth row which was exposed just prior to making fifty-first telephone call with the card 80. When all the components (120) have been exposed and used, a new card is issued to the authorized user.

Turning to FIGS. 9–12, another embodiment is illustrated for using a credit card. FIG. 9 shows a telephone credit card 88 with a back face 90 showing the order of exposing the variable codes of the authorized user's access code listed on the front face of the card. In this example, the numbers "1" through "8" are listed in increasing order from the first row, first column to the first row, eighth column. The numbers "9" through "16" are listed in increasing order from the second row, first column to the second row, eighth column. This pattern continues row by row ending with the numbers "113" through "120" listed in increasing order from the fifteenth row, first column to the fifteenth row, eighth column.

FIG. 10 shows the front face 92 of the credit card 88 exposing the first valid variable code in the first row, first column just prior to making the first telephone call with the credit card. As can be seen in FIG. 10, the first exposed component is "214".

To find the next component to be exposed for making the second telephone call, the authorized user merely looks at the back face 90 of the credit card 88 as shown in FIG. 9 and notes that the number "2" associated with the second telephone call is located in the first row, second column. The user then turns the card over to the front face 92 and removes the opaque material over the first row, second column so as to expose the number "328" as shown in FIG. 11 which number is the currently valid variable code that will be recognized by the telephone service.

After the entire first row of numbers is exposed upon making eight telephone calls, the second row of components is exposed in the same manner as that of the first row. Each row is exposed in increasing number (from top to bottom as shown in FIGS. 10–12 until the fifteenth row is fully exposed. For example, FIG. 12 shows the currently valid variable code "230" located in the third row, second column which was exposed just prior to making eighteenth telephone call with the credit card 88. When all the components (120) have been exposed and used, a new card is issued to the authorized user.

The system may be modified to recognize instances where the authorized user has made a mistake in forgetting to expose the next variable code, or where the user has exposed too many variable codes. Referring to FIG. 12, the user may be about to make his tenth telephone call associated with the currently valid variable code "719" located in the second row, second column, but forgets to expose this code. In this case the system may be modified to also recognize as valid the ninth component "111" located in the second row, first column (what the user thinks should be the currently valid variable code). Similarly, the user may be about to make his tenth telephone call associated with the currently valid variable code "719" located in the second row, second column, but has accidentally exposed one too many components. In this case the system also recognizes as valid the eleventh component "200" located in the second row, third column (what the user thinks should be the currently valid variable code). Both of these modifications can be combined so that the system recognizes three components as valid during any given telephone call. Of course other modifications recognizing more than one currently valid variable code can be made to protect the authorized user from his mistakes. However, it is preferable that only one variable code be valid during any given telephone call so as to best protect against unauthorized use of the telephone service.

The credit cards shown in the above embodiments may also be used in a system that does not include the fixed component of the access code. The variable codes in such a system both identify the authorized user and identify the currently valid code for making the present telephone call. However, such a modification would be unwieldy since each of the variable codes listed on the credit card would require a relatively large number of digits to carry information for both customer identification and the current telephone code.

As will be recognized by those of ordinary skill in the pertinent art, numerous modifications may be made to the above-described and other embodiments of the present invention without departing from the scope of the appended claims. Accordingly, the preceding portion of this specification is to be taken in an illustrative, as opposed to a limiting sense.

I claim:

1. A telephone system, comprising:
    means for preventing access to a telephone service by unauthorized users, including an access code having a fixed component identifying an authorized user and having a plurality of variable components associated with the fixed component, at least one of the plurality of variable components comprising at least one currently valid variable component for the purpose of processing a telephone call by the telephone service; and
    means for changing the at least one currently valid variable component to be used for making the next telephone call from among the plurality of variable components in a predetermined sequence to prevent stealing of the access code by unauthorized users.

2. A telephone system as defined in claim 1, wherein the means for preventing access includes means for storing a plurality of access codes, means for identifying the at least one currently valid variable component of each access code, and means provided to each authorized user for using the at least one currently valid variable component associated with the fixed component.

3. A telephone system as defined in claim 2, wherein the means for using includes means for electronically determining the at least one currently valid variable component of an access code of the authorized user.

4. A telephone system as defined in claim 2, wherein the means for using includes means for electronically determining and electronically displaying the at least one currently valid variable component of an access code of the authorized user.

5. A telephone system as defined in claim 2, wherein the means for using includes a credit card listing the plurality of variable components associated with an authorized user.

6. A telephone system as defined in claim 5, wherein the plurality of variable components listed on the credit card are arranged in a predetermined row and column format associated with the number of telephone calls made so as to aid the user in determining the at least one currently valid variable component of the access code to be recognized by the system.

7. A telephone system as defined in claim 6, wherein the predetermined row and column format locates the at least one currently valid variable component for the first phone call in the first row, first column, and the at least one currently valid variable component for each subsequent telephone call is located in increasingly higher-numbered adjacent columns in the first row, when a row of components being exhausted, the at least one currently valid variable component for subsequent telephone calls being located starting with the first column in increasingly higher-numbered adjacent rows.

8. A telephone system as defined in claim 6, wherein the predetermined row and column format locates the at least one currently valid variable component for the first phone call in the first row, first column, and the at least one currently valid variable component for each subsequent telephone call is located in increasingly higher-numbered adjacent rows in the first column, when a column of components being exhausted, the at least one currently valid variable component for subsequent telephone calls being located starting with the first row in increasingly higher-numbered adjacent columns.

9. A telephone system as defined in claim 5, further including means for identifying the at least one currently valid variable component from among the plurality of variable components listed on the credit card.

10. A telephone system as defined in claim 9, wherein the means for identifying is an opaque material to be removed in a predetermined sequence with each telephone call to expose the next at least one currently valid variable component of the access code.

11. A telephone system as defined in claim 5 wherein the credit card further includes numbers associated with the number of telephone calls made with the credit card, the numbers arranged in row and column format matching the arrangement of variable components to aid the authorized user in determining the next at least one currently valid variable component to expose for making the next telephone call.

12. Apparatus for preventing access to a subscriber telephone service having telephone charge accounts for authorized users, comprising:
    a telephone credit card for obtaining access to a telephone service by means of a personal access code of an authorized user, the personal access code associated with each authorized user including a fixed component identifying the authorized user and a plurality of variable components, at least one of the plurality of variable component comprising at least one currently valid variable component during any given telephone call for the purpose of obtaining access to the telephone service, the credit card listing the plurality of variable components in a predetermined sequence usable by the telephone service, the sequence informing the authorized user as to what the next at least one currently valid variable component the telephone service will recognize for the purpose of processing the next telephone call.

13. Apparatus as defined in claim 12, further including means for identifying the at least one currently valid variable component from among the plurality of variable components listed on the card.

14. Apparatus as defined in claim 13, wherein the means for identifying is an opaque material to be rubbed off so as to reveal the next at least one currently valid variable component of the personal access code to be used for completing the next telephone call by the authorized user.

15. Apparatus as defined in claim 13, wherein the means for identifying is an opaque material to be peeled off so as to reveal the next at least one currently valid variable component of the personal access code to be used for completing the next telephone call by the authorized user.

16. A telephone system including:

memory means for storing personal access codes of authorized users, each access code of an authorized user including a fixed component for identifying an authorized user and including a plurality of variable components associated with each authorized user;

means for assigning at least one of the plurality of variable components associated with each authorized user as at least one currently valid variable component for the purpose of completing a telephone call;

means for receiving a transmitted personal access code including a fixed component and a variable component;

means for retrieving the at least one currently valid variable component associated with the authorized user making a telephone call;

means for comparing the at least one currently valid variable component with a transmitted variable component;

means for completing a telephone call conditioned on a match between the transmitted variable component and the at least one currently valid variable component; and means for changing the at least one currently valid variable component in a predetermined sequence.

17. A method of preventing access to a subscriber telephone service having telephone charge accounts for authorized users, comprising the following steps:

providing personal access codes to both authorized users and a telephone service, each personal access code having a fixed component for identifying an authorized user and having a plurality of variable components associated with each authorized user, at least one of the plurality of variable components comprising a currently valid variable component during any given telephone call for the purpose of obtaining access to the telephone service;

transmitting a personal access code from an authorized user to the telephone service for the purpose of making a telephone call;

receiving from the user the transmitted personal access code and identifying the authorized user by means of the fixed component of the transmitted access code;

retrieving the at least one currently valid variable component of the access code by the personal service from among the plurality of variable components associated with the authorized user;

comparing the transmitted variable component to the at least one currently valid variable component and completing the telephone call conditioned on a match therebetween; and changing the at least one currently valid variable component from among the plurality of variable components specific to the authorized user on completion of each telephone call according to a predetermined sequence usable by the authorized user and the personal service in order to hinder an unauthorized user from making a telephone call through the personal service with the same access code used to complete a previous telephone call.

18. A telephone system, comprising:

means for preventing access to a telephone service by unauthorized users, including an access code having a plurality of variable codes unique to each authorized user, at least one of the plurality of variable codes comprising at least one currently valid variable code for the purpose of processing a telephone call by the personal service; and means for changing the at least one currently valid variable code to be used for making the next telephone call from among the plurality of variable codes in a predetermined sequence to prevent stealing of the access code by unauthorized users.

* * * * *